United States Patent
Hsu et al.

(10) Patent No.: US 8,464,547 B2
(45) Date of Patent: Jun. 18, 2013

(54) COOLING RACK STRUCTURE OF THERMOELECTRIC COOLING TYPE

(75) Inventors: Ken Hsu, Wugu Township, Taipei County (TW); Chih-Hung Cheng, Wugu Township, Taipei County (TW); Chen-Hsiang Lin, Wugu Township, Taipei County (TW); Kuo-Len Lin, Wugu Township, Taipei County (TW)

(73) Assignees: Golden Sun News Techniques Co., Ltd., New Taipei (TW); CPUMate Inc., New Taipei (TW)

( * ) Notice: Subject to any disclaimer, the term of this patent is extended or adjusted under 35 U.S.C. 154(b) by 541 days.

(21) Appl. No.: 12/711,341

(22) Filed: Feb. 24, 2010

(65) Prior Publication Data

US 2011/0203295 A1  Aug. 25, 2011

(51) Int. Cl.
*F25D 23/12* (2006.01)
*F25B 21/00* (2006.01)
*F24H 3/06* (2006.01)
*F28F 7/00* (2006.01)
*F28D 15/00* (2006.01)
*G06F 1/20* (2006.01)
*H05K 7/20* (2006.01)

(52) U.S. Cl.
USPC .......... 62/259.2; 62/3.1; 62/3.2; 165/122; 165/80.2; 165/80.3; 165/80.4; 165/104.33; 361/679.47; 361/696; 361/697; 361/678; 361/702

(58) Field of Classification Search
USPC ........... 62/3.1–3.2, 259.2; 165/80.2–80.4, 165/104.21, 104.33, 121, 122; 361/679.47–679.49, 694–697, 678, 702, 361/703
See application file for complete search history.

(56) References Cited

U.S. PATENT DOCUMENTS

| | | | | |
|---|---|---|---|---|
| 5,790,376 A | * | 8/1998 | Moore | 361/700 |
| 6,239,971 B1 | * | 5/2001 | Yu et al. | 361/695 |
| 6,695,041 B2 | * | 2/2004 | Lai et al. | 165/104.33 |
| 6,781,832 B2 | * | 8/2004 | Nakamura et al. | 361/695 |
| 6,813,149 B2 | * | 11/2004 | Faneuf et al. | 361/679.49 |
| 6,826,047 B1 | * | 11/2004 | Chen et al. | 361/679.47 |
| D555,162 S | * | 11/2007 | Park et al. | D14/447 |
| 7,453,694 B2 | * | 11/2008 | Lee | 361/679.48 |
| 7,800,903 B2 | * | 9/2010 | Wang | 361/695 |
| 7,885,068 B2 | * | 2/2011 | Seo et al. | 361/695 |
| 2002/0038550 A1 | * | 4/2002 | Gillen | 62/3.7 |
| 2004/0165355 A1 | * | 8/2004 | Chen | 361/709 |

(Continued)

*Primary Examiner* — Frantz Jules
*Assistant Examiner* — Joseph Trpisovsky
(74) *Attorney, Agent, or Firm* — Chun-Ming Shih; HLDS IPR Services

(57) ABSTRACT

A cooling rack structure includes a cooling plate (1), a temperature conductor (2), a centrifugal fan (3), a cooling body (4) and a thermoelectric cooling component (5). A temperature-super-conducting component (13) is disposed on an inner surface (11) of the cooling plate (1). The temperature conductor (2) is arranged on the temperature-super-conducting component (13). In addition, a heat-exhausting hole (120) is arranged on an upper side of the cooling plate (1). The centrifugal fan (3) is disposed between the temperature conductor (2) and the heat-exhausting hole (120) while the cooling body (4) is disposed between the fan (3) and the heat-exhausting hole (120). A hot side face (501) of the thermoelectric cooling component (5) closely contacts the cooling body (4) while a cold side face (500) is arranged on the temperature-super-conducting component (13). By quickly conducting the low temperature generated from the thermoelectric cooling component (5) onto the cooling plate (1) through the temperature-super-conducting component (13), a low temperature surface can be uniformly provided to obtain a cooling effect.

7 Claims, 7 Drawing Sheets

U.S. PATENT DOCUMENTS

| | | | |
|---|---|---|---|
| 2005/0207119 A1* | 9/2005 | Huang | 361/697 |
| 2006/0005548 A1* | 1/2006 | Ruckstuhl | 62/3.2 |
| 2006/0061964 A1* | 3/2006 | Cheng | 361/687 |
| 2007/0163269 A1* | 7/2007 | Chung et al. | 62/3.2 |
| 2008/0016881 A1* | 1/2008 | Steffensen et al. | 62/3.3 |
| 2009/0178783 A1* | 7/2009 | Lin | 165/80.4 |
| 2010/0186928 A1* | 7/2010 | Chen | 165/67 |

* cited by examiner

COOLING RACK STRUCTURE OF THERMOELECTRIC COOLING TYPE

BACKGROUND OF THE INVENTION

1. Field of the Invention

The present invention in general relates to a cooling accessory, in particular, to a cooling rack structure adapted for electronic heating products, for example, notebook computer.

2. Description of Prior Art

Accordingly, following progress and development of technology, computer has already become a dispensable instrument in our daily lives. Especially, notebook computer is a best assistant for mobile commerce, due to its light weight and easy carry. However, limited by small volume, the inside electronic component or assembly of notebook computer is obviously inferior to that of desktop computer, in terms of cooling. So, notebook computer sometimes relies on external cooling structure to provide cooling. Furthermore, under normal condition, notebook is used by laying its bottom part onto the desktop, so heat is easily accumulated and unable to dissipate. Therefore, a cooling rack placed under notebook computer to dissipate heat is emerging correspondingly.

According to prior arts, except made of materials of excellent properties of thermal conduction or cooling, this kind of cooling rack is further arranged fan or other cooling device to enhance its cooling effect. However, no matter of fan or any kind of cooling device, a cooling function can only apply to local position of the cooling rack, aiming to cool the main heat sink of notebook computer. Since already fixed on the cooling rack after the shipment of product, the fan or cooling devices commonly installed is unable to fulfill the real requirement of different kinds of notebook computer. In other words, it is not always the case that the fan or cooling device is placed at a right position of notebook computer, i.e., the main heat sink. So, there are a lot of limitations, when a consumer is purchasing a product of cooling rack.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide a cooling rack structure of thermoelectric cooling type, in which thermoelectric cooling component and temperature-super-conducting component are combined for cooperation, such that low temperature generated by the thermoelectric cooling component can be quickly conducted over the entire surface of the cooling rack through the temperature-super-conducting component. Thereby, through uniform low temperature surface provided by the cooling rack, the bottom face of a notebook can obtain an excellent cooling effect. In the meantime, without any limitation, the cooling rack according to the invention can be adapted for any kind of notebook computer.

Secondly, the invention is to provide a cooling rack structure of thermoelectric cooling type, in which through the combination of two conductors or cooling bodies with a centrifugal fan, not only can help cooling rack provide cooling effect, but also can a hot side face of the thermoelectric cooling component be arranged for cooling, such that the high temperature generated by the thermoelectric cooling component can be dissipated.

Thirdly, the invention is to provide a cooling rack structure of thermoelectric cooling type, including a cooling plate, a temperature conductor, a centrifugal fan, a cooling body and a thermoelectric cooling component. The cooling plate has a supporting surface, under which there is an inner surface, on which a temperature-super-conducting component is disposed. In addition, a supporting part is extended from an upper side of the cooling plate toward the inner surface. In the meantime, a heat-exhausting hole is arranged on the supporting part. The temperature conductor, having a plurality of fins interspaced to each other, is arranged by closely contacting with the temperature-super-conducting component. On the other hand, the centrifugal fan has a sucking inlet and an exhausting outlet, and the former one is arranged by corresponding to the fins of the temperature conductor, while the later one is interspaced correspondingly with the heat-exhausting hole. The cooling body has a plurality of cooling fins interspaced to each other and is arranged between the heat-exhausting hole and the exhausting outlet. The cooling fins of the cooling body are configured by extending along the direction starting from the exhausting outlet toward the heat-exhausting hole. The thermoelectric cooling component has a cold side face and a hot side face, and the former one is arranged by closely contacting with the temperature-super-conducting component, while the later one is arranged by closely contacting with the cooling body. Thereby, since the cold side face of the thermoelectric cooling component is arranged by closely contacting with the temperature-super-conducting component, the low temperature generated by the thermoelectric cooling component is quickly conducted over the cooling plate through the temperature-super-conducting component, such that aforementioned objectives are thereby achieved.

BRIEF DESCRIPTION OF DRAWING

The features of the invention believed to be novel are set forth with particularity in the appended claims. The invention itself, however, may be best understood by reference to the following detailed description, which describes a number of embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, not used to limit its executing scope. Any equivalent variation and modification made according to appended claims is all covered by the claims claimed by the present invention.

Figure 1:
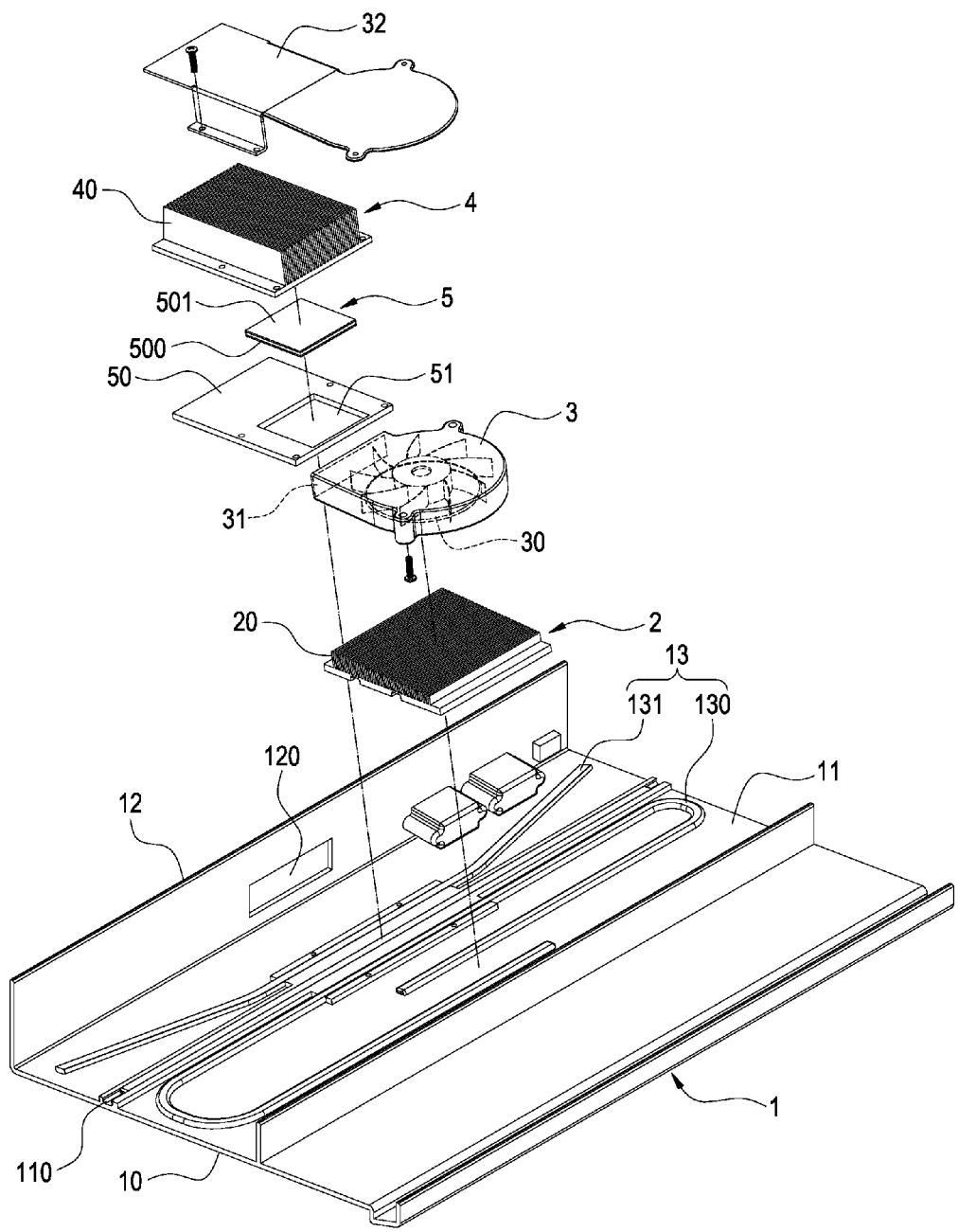
FIG. 1 is a perspective explosive illustration according to the present invention viewed from an elevation angle.
Figure 2:
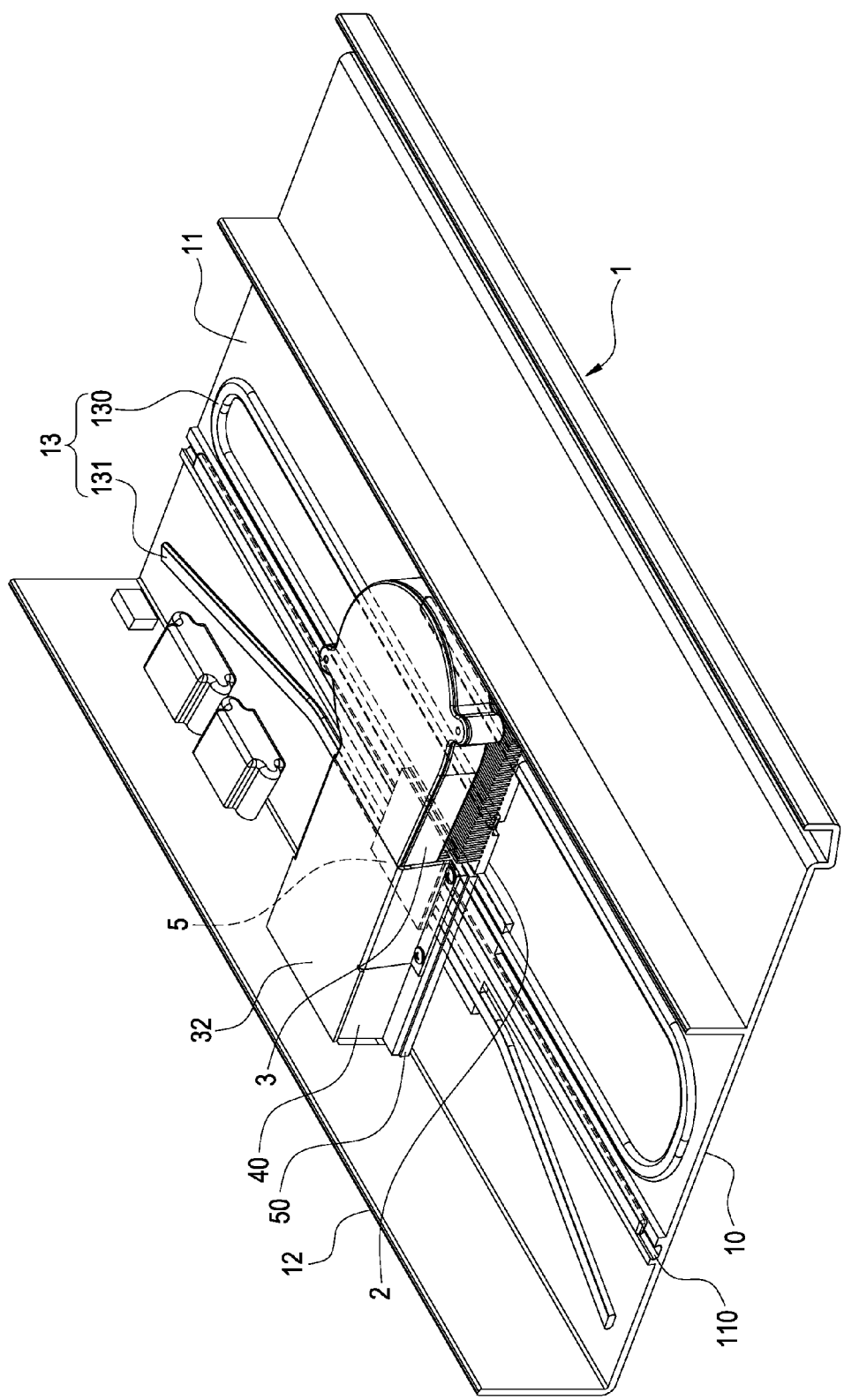
FIG. 2 is a perspective assembled illustration according to the present invention viewed from an elevation angle.
Figure 3:
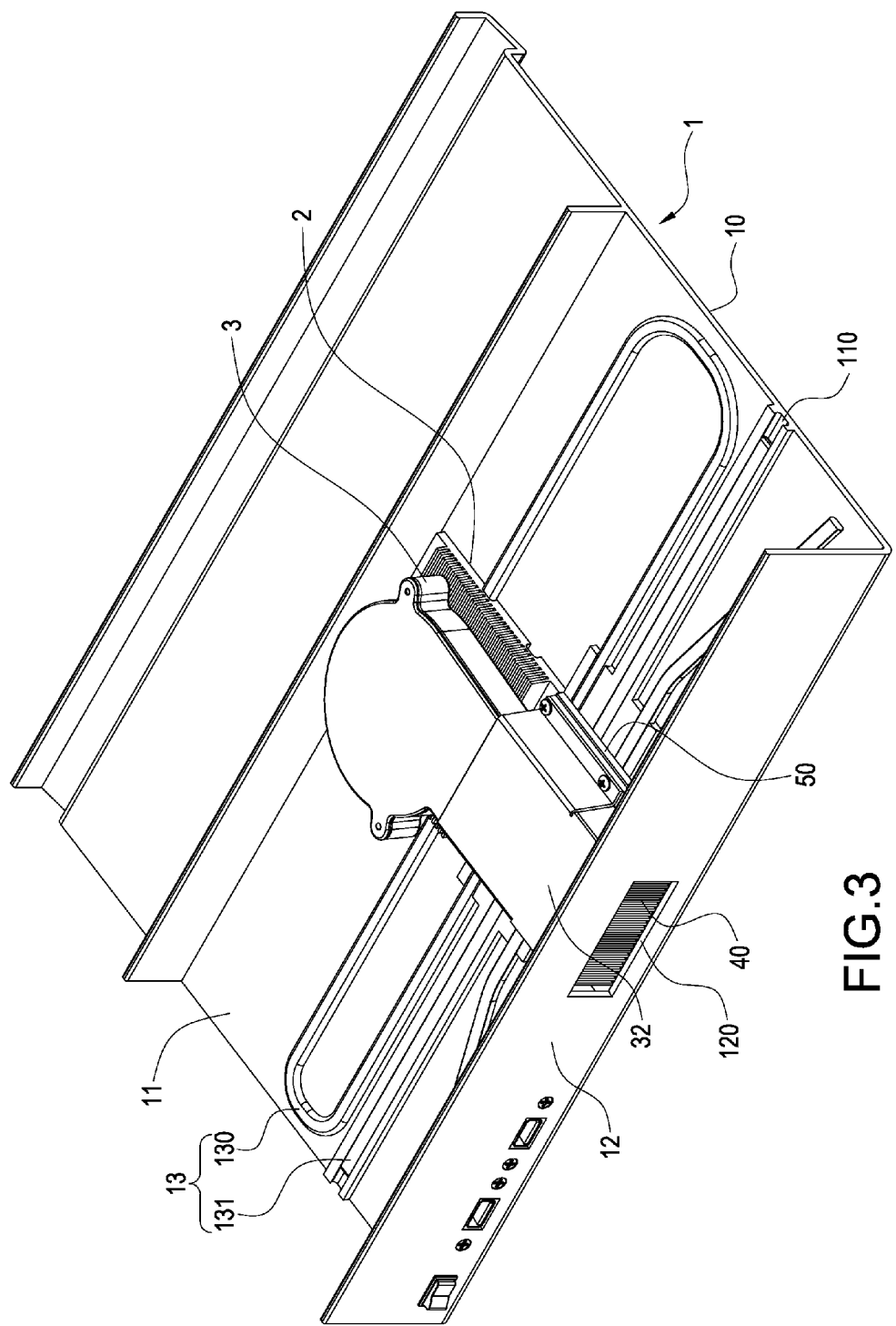
FIG. 3 is a perspective assembled illustration according to the present invention viewed from another elevation angle.

Please refer to FIG. 1 through FIG. 3, separately showing a perspective explosive illustration and a perspective assembled illustration according to the present invention viewed from an elevation angle, and a perspective assembled illustration according to the present invention viewed from another elevation angle. The invention is to provide a cooling rack structure of thermoelectric cooling type, including a cooling plate 1, a temperature conductor 2, a centrifugal fan 3, a cooling body 4 and a thermoelectric cooling component 5.

Figure 6:
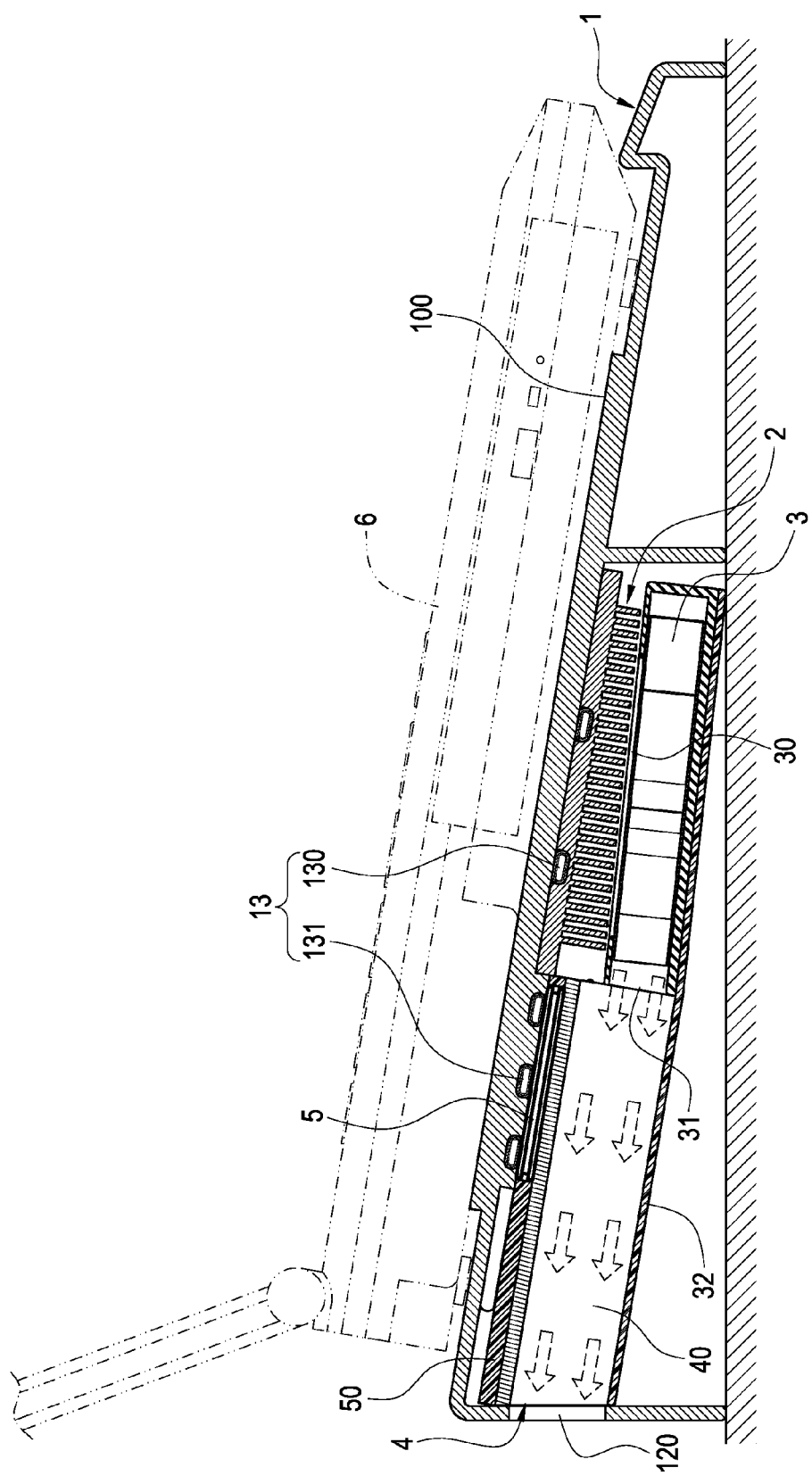
FIG. 6 is an illustration showing that the presentation is used in cooperation with a notebook computer.

The cooling plate 1 can be constituted of materials with excellent property of thermal conduction, such as, aluminum or copper. The cooling plate 1 is adapted for a notebook computer 6 (as shown in FIG. 6) to be laid thereon. The cooling plate 1 has a supporting surface 10 arranged thereon and able to be closely contacted with a notebook computer 6, while an inner surface 11 is arranged on the other side. Can be configured as a plate shape, a supporting part 12 is extended from an upper side of the cooling plate 1 toward the inner surface 11. The supporting part 12 is disposed in a vertical position, while the cooling plate 1 is inclined and adapted for cooling the notebook computer 6. Additionally, a heat-exhausting hole 120 is arranged on the supporting part 12. In this case, at least one temperature-super-conducting component 13 is arranged on the inner surface 11 of the cooling plate 1 in a way, such that the temperature-super-conducting component 13 can be extended and distributed according to the inner surface 11 of the cooling plate 1. Meanwhile, according to the embodiments proposed by the present invention, the temperature-super-conducting component 13 can be a plurality of super-conducting-pipes, such as, heat pipes, etc. The temperature-super-conducting component 13 can be divided into at least one first heat pipe 130 and at least one second heat pipe 131. In addition, at least one groove 131 can be formed on the inner surface 11 of the cooling plate 1 for the temperature-super-conducting component 13 to be embedded and fixed therein.

The temperature conductor 2, having a plurality of fins 20 interspaced to each other, can be a cooler made by aluminum extrusion process and formed as a stacking configuration. At the same time, the temperature conductor 2 is arranged by closely contacting the first heat pipe 130, substantially corresponding to the central position of the inner surface 11 of the cooling plate 1. In this case, the temperature conductor 2 mainly corresponds to the first heat pipe 130, helping the first heat pipe 130 provide a condensation function.

Basically, the centrifugal fan 3 arranged on each fin 20 of the temperature conductor 2 has a sucking inlet 30 and an exhausting outlet 31. In this case, the sucking inlet 30 is opposite to each fin 20 of the temperature conductor 2, while the exhausting outlet 31 faces to the supporting part 12 of the cooling plate 1 and is interspaced correspondingly to the heat-exhausting hole 120 of the supporting part 12.

The cooling body 4 also has a plurality of cooling fins 40 interspaced to each other and can be a cooler made of aluminum extrusion process and formed as a stacking configuration as well. In this case, the cooling body 4 is arranged between the heat-exhausting hole 120 and the exhausting outlet 31, making each cooling fin 40 configured by extending along the direction starting from the exhausting outlet 31 toward the heat-exhausting hole 120, such that the centrifugal fan 3 can be adapted for expelling the hot airflow. In other words, after passing through each cooling fin 40 of the cooling body 4, the hot airflow can be exhausted to the ambience by passing through the heat-exhausting hole 120. In addition, an air hood 32 can be arranged over the centrifugal fan 3 and the cooling body 4, so it can ensure that the airflow blown from the centrifugal fan 3 can pass through the space between each cooling fin 40 of the cooling body 4.

The thermoelectric cooling component 5 can be a thermoelectric cooling chip arranged between the cooling plate 1 and the cooling body 4 and having a cold side face 500 and a hot side face 501. Essentially, the cold side face 500 is arranged by closely contacting the second heat pipe 131 or making the second heat pipe 130 passing through the cold side face 500, while the hot side face 501 inter-contacts the cooling body 4. By so doing, the cold side face 500 of the thermoelectric cooling component 5 contacts the second heat pipe 131 to make the lower temperature uniformly conducted over the cooling plate 1 through the second heat pipe 5. In the meantime, the cooling body 4 can help the hot side face 501 of the thermoelectric cooling component 5 undertake a cooling process, and the hot air accumulated in each cooling fin 40 of the cooling body 4 can be expelled by the centrifugal fan 3. Moreover, the thermoelectric cooling component 5 can also be further arranged on a substrate 50. Conforming to the shape of the thermoelectric cooling component 5, an opening 51 is arranged on the substrate 50. Thereby, the thermoelectric cooling component 5 can be placed in the opening 51 and fixed at a position between the cooling plate 1 and the cooling body 4. In this case, the substrate 50 is constituted of materials having excellent property of thermal conduction, such as, aluminum or copper, for facilitating the thermal conducting process.

Therefore, through the constitution of aforementioned assemblies, a cooling rack structure of thermoelectric cooling type according to the present invention is thus obtained.

Figure 4:
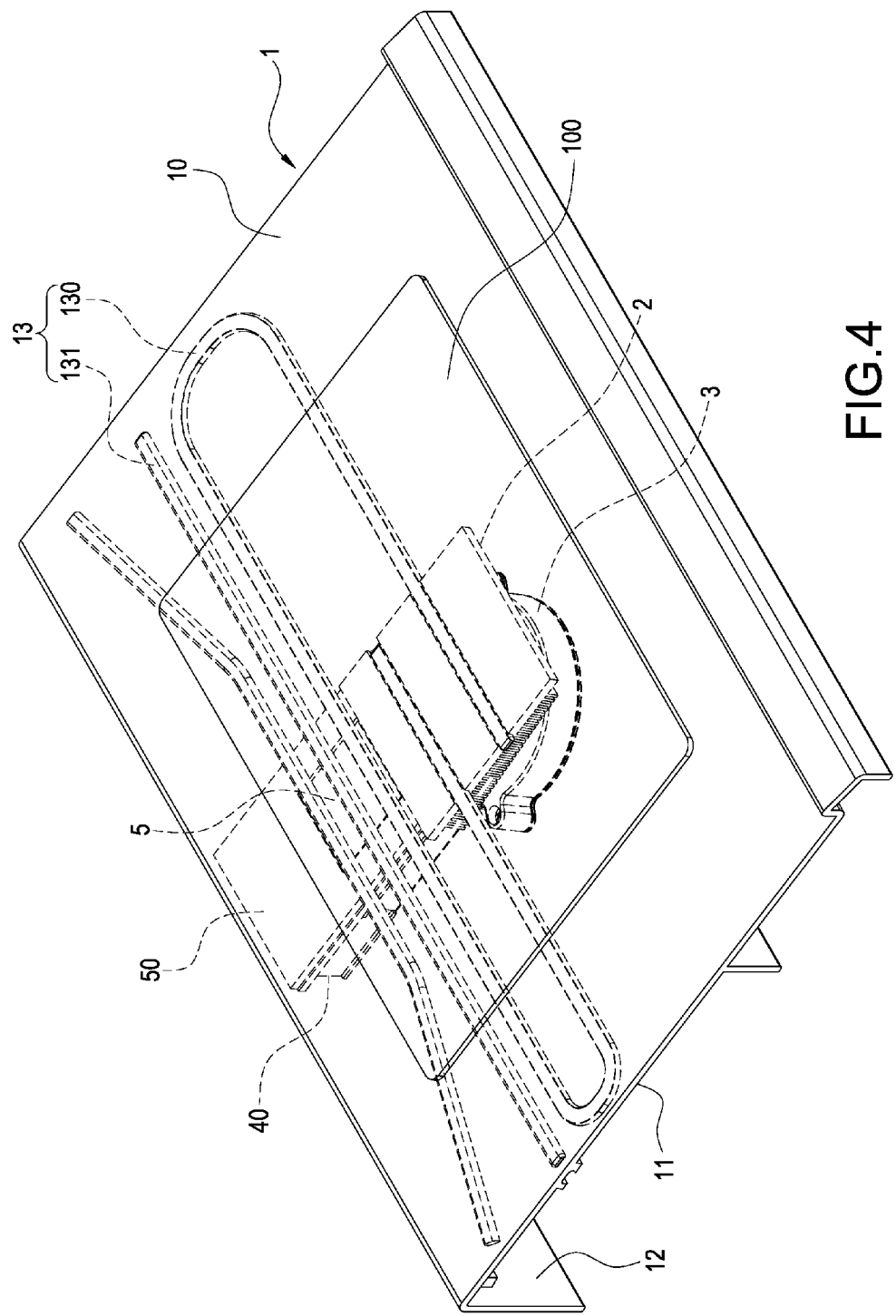
FIG. 4 is a perspective assembled illustration according to the present invention viewed from an overlooking angle.

As shown in FIG. 4 and FIG. 6, since the bottom face of a common notebook computer 6 is usually arranged anti-slipping pads, the bottom face is unable to contact the cooling rack directly, when the notebook computer 6 is placed on the cooling rack. Therefore, in order to make the supporting surface 10 able to closely contact the bottom face of the notebook computer 6, a heightening part 100 can be formed by projecting up the supporting surface 10 of the cooling plate 1, whereby the heightening part 100 can directly contact the bottom face of the notebook computer 6.

Figure 5:
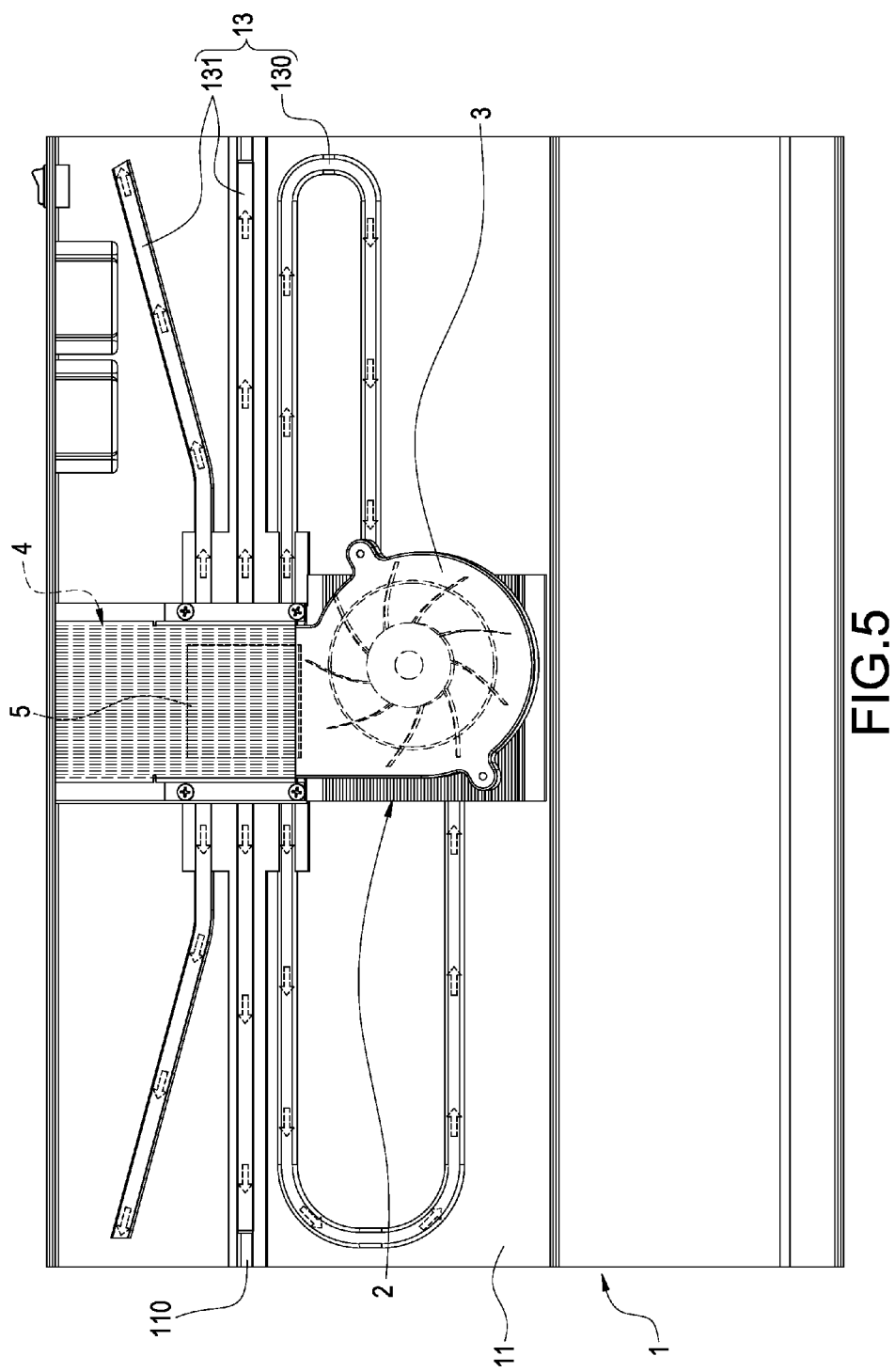
FIG. 5 is a plane illustration according to the present invention viewed from an elevation angle.

Accordingly, as shown in FIG. 5 and FIG. 6, when the cooling rack of the present invention starts operating, the low temperature generated by the thermoelectric cooling component 5 is conducted over the cooling plate 1 through the second heat pipe 131, making the entire surface of the cooling plate 1 have a lower temperature to dissipate the heat generated from the notebook computer 6. In the meantime, due to the heat generation, when the temperature of the notebook computer 6 rises, the first heat pipe 130 can conduct the high temperature of the cooling plate 1 onto the temperature conductor 2. Sucked out by the centrifugal fan 3, the heat accumulated in each fin 20 of the temperature conductor 2 can be expelled through the heat-exhausting hole 120 to the ambience. Furthermore, when the centrifugal fan 3 is expelling the heat, since the cooling body 4 is attached onto the hot side face 501 of the thermoelectric cooling component 5, the heat generated from the thermoelectric cooling component 5 can also be dissipated by the cooling body 4. Together with the centrifugal fan 3, the heat accumulated in each cooling fin 40 of the cooling body 4 can be expelled through the heat-exhausting hole 120 to the ambience.

Figure 7:
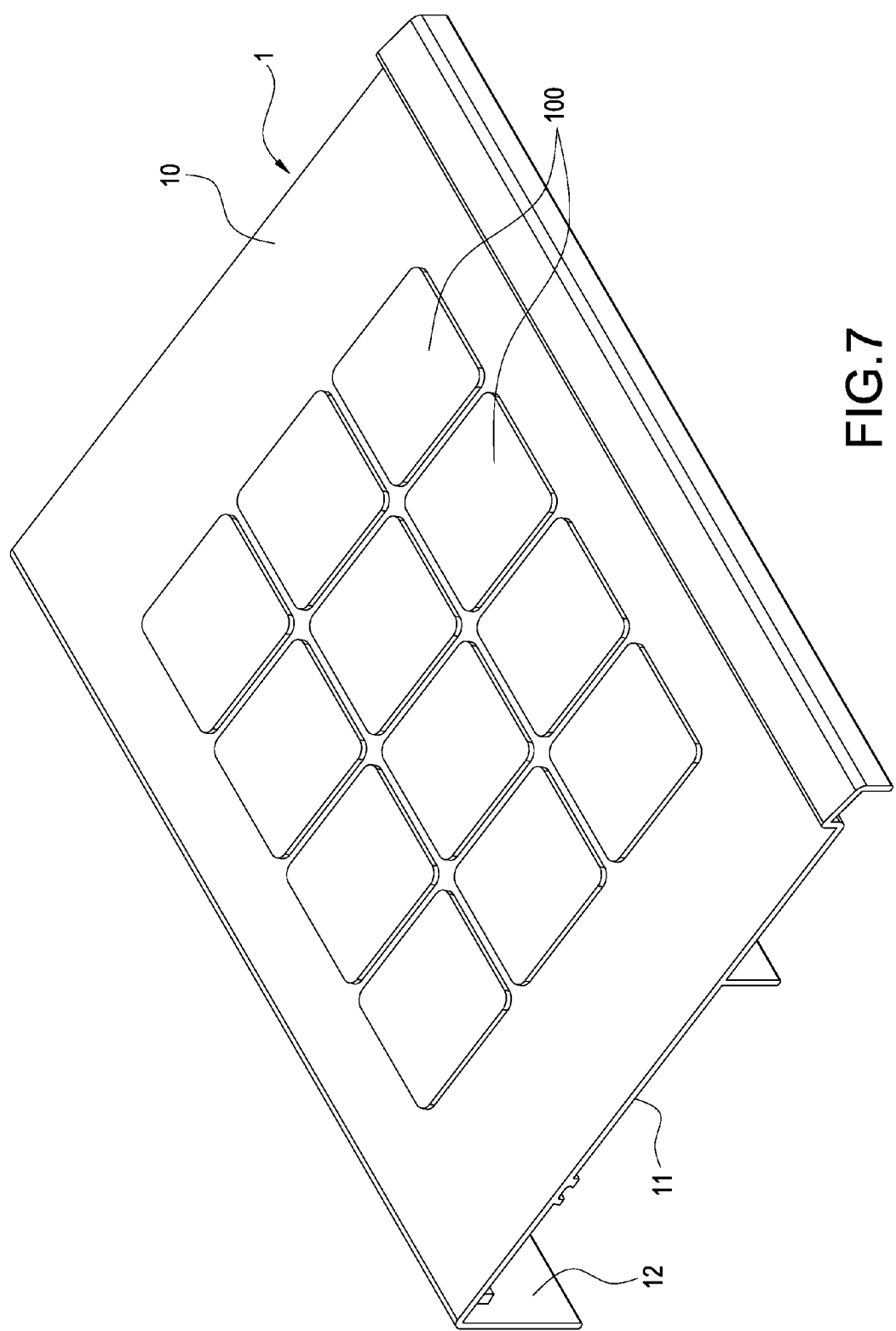
FIG. 7 is a perspective assembled illustration according to another embodiment of the present invention viewed from an overlooking angle.

In addition, as shown in FIG. 7, the heightening parts 100 projected up the supporting surface 10 of the cooling plate 1 can also be constituted of a plurality of blocks and arranged as a rectangular array.

By so doing, the cooling rack structure according to the present invention not only can generate uniform low temperature over the entire surface of the cooling rack for facilitating a cooling process to a notebook computer, but also can get rid of the limitation on purchasing only specific kind of notebook computer. In the meantime, since a single centrifugal fan is adapted by corresponding to the first and the second cooling bodies for processing multiple ways of heat dissipation, a more efficient cooling system is thus formed.

Summarizing aforementioned description, the cooling rack structure of thermoelectric cooling type according to the present invention is an indispensable structure for cooling a notebook computer indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A cooling rack structure of thermoelectric cooling type, including:
   a cooling plate (1), which has a supporting surface (10), under which there is an inner surface (11), a supporting part (12) being extended from an upper side of the cooling plate (1) toward the inner surface (11), a heat-exhausting hole (120) being arranged on the supporting part (12);
   a plurality of heat pipes (13) attached onto the inner surface (11) and arranged in a way such that the heat pipes (13) can be extended and distributed according to the inner surface (11), which has a first heat pipe (130) and a second heat pipe (131);
   a temperature conductor (2) which has a plurality of fins (20) interspaced to each other and configured by extending along a first direction, and which is arranged by closely attaching onto the first heat pipe (130);
   a centrifugal fan (3) which has a sucking inlet (30) arranged corresponding to the fins (20) of the temperature conductor (2) and an exhausting outlet (31) interspaced correspondingly with the heat-exhausting hole (120);
   a cooling body (4) which has a plurality of cooling fins (40) interspaced to each other and configured by extending along a second direction substantially perpendicular to the first direction starting from the exhausting outlet (31) toward the heat-exhausting hole (120), and which is arranged between the heat-exhausting hole (120) and the exhausting outlet (31) to abut the temperature conductor (2) and the centrifugal fan (3) at one side and abut the heat-exhausting hole (120) at the other side; and
   a thermoelectric cooling component (5) which has a cold side face (500) arranged by closely contacting with the second heat pipe (131) and a hot side face (501) arranged by closely contacting with the cooling body (4).

2. The cooling rack structure of thermoelectric cooling type according to claim 1, wherein a heightening part (100) is formed by projecting up the supporting surface (10) of the cooling plate (1).

3. The cooling rack structure of thermoelectric cooling type according to claim 2, wherein the heightening part (100) is constituted of a plurality of blocks and formed as a rectangular array.

4. The cooling rack structure of thermoelectric cooling type according to claim 1, wherein the temperature conductor (2) and the cooling body (4) are all made by an aluminum extrusion process and configured as a stacking shape.

5. The cooling rack structure of thermoelectric cooling type according to claim 1, wherein an air hood (32) is further arranged over the centrifugal fan (3) and the cooling body (4).

6. The cooling rack structure of thermoelectric cooling type according to claim 1, wherein the thermoelectric cooling component (5) is a thermoelectric cooling chip.

7. The cooling rack structure of thermoelectric cooling type according to claim 1, wherein the thermoelectric cooling component (5) is further arranged on a substrate (50) which is arranged by being fixed between the cooling plate (1) and the cooling body (4), and on which an opening (51) conforming to a shape of the thermoelectric cooling component (5) is arranged to be provided for the thermoelectric cooling component (5) placed therein.

* * * * *